US010687171B1

(12) United States Patent
Snyder et al.

(10) Patent No.: US 10,687,171 B1
(45) Date of Patent: *Jun. 16, 2020

(54) DETECTING HANDLING OF A DEVICE IN A VEHICLE

(71) Applicant: Arity International Limited, Chicago, IL (US)

(72) Inventors: Jared S. Snyder, Chicago, IL (US); Dana Ferguson, Chicago, IL (US)

(73) Assignee: Arity International Limited, Belfast (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,871

(22) Filed: Jun. 19, 2019

Related U.S. Application Data

(63) Continuation of application No. 16/130,607, filed on Sep. 13, 2018, now Pat. No. 10,375,525, which is a
(Continued)

(51) Int. Cl.
*H04W 24/00* (2009.01)
*H04W 4/02* (2018.01)

(52) U.S. Cl.
CPC ........... *H04W 4/027* (2013.01); *H04W 4/026* (2013.01)

(58) Field of Classification Search
CPC . H04W 64/00; H04W 64/003; H04W 64/006; H04W 4/02; H04W 4/026;
(Continued)

(56) References Cited

U.S. PATENT DOCUMENTS

| 5,895,436 A | 4/1999 | Savoie et al. |
| 5,969,595 A | 10/1999 | Schipper et al. |

(Continued)

FOREIGN PATENT DOCUMENTS

| EP | 1229343 A1 | 8/2002 |
| EP | 2099203 A1 | 9/2009 |

(Continued)

OTHER PUBLICATIONS

"GPS Altitude Readout > How Accurate?", Joe Mehaffey, Altitude Accuracy, retrieved Apr. 23, 2015 from <http://gpsinformation.net/main/altitude.htm>.

(Continued)

*Primary Examiner* — Temica M Beamer
(74) *Attorney, Agent, or Firm* — Banner & Witcoff, Ltd.

(57) ABSTRACT

Systems and methods are disclosed for determining whether or not an apparatus, such as a mobile device, is being handled or otherwise used within a vehicle. The apparatus may comprise an accelerometer configured to measure acceleration and a gyroscope configured to measure orientation. The apparatus may determine an axis of gravity of the apparatus based on acceleration measurements made by the accelerometer over a period of time. The apparatus may also determine a rotation vector of the apparatus based on orientation measurements made by the gyroscope. Using the axis of gravity of the apparatus and the rotation vector of the apparatus, the apparatus may determine a rate of rotation of the apparatus perpendicular to the axis of gravity. If the rate of rotation of the apparatus perpendicular to the axis of gravity exceeds a threshold, the apparatus may determine that it is being handled or otherwise used within the vehicle.

20 Claims, 4 Drawing Sheets

Related U.S. Application Data continuation of application No. 15/851,052, filed on Dec. 21, 2017, now Pat. No. 10,117,060, which is a continuation of application No. 14/808,472, filed on Jul. 24, 2015, now Pat. No. 9,888,392.

(58) Field of Classification Search
CPC ... H04W 4/027; H04W 88/02; H04W 70/408; H04W 70/468; H04W 70/469; H04W 70/50; H04W 70/507
USPC ............... 455/456.1, 456.6, 550.1, 556.1
See application file for complete search history.

(56) References Cited

U.S. PATENT DOCUMENTS

| | | |
|---|---|---|
| 6,225,897 B1 | 5/2001 | Doyle et al. |
| 7,286,857 B1 | 10/2007 | Walker et al. |
| 7,474,264 B2 | 1/2009 | Bolduc et al. |
| 7,489,240 B2 | 2/2009 | Soliman |
| 7,646,312 B2 | 1/2010 | Rosen |
| 7,788,063 B2 | 8/2010 | Bodin et al. |
| 7,876,205 B2 | 1/2011 | Catten et al. |
| 7,933,547 B2 | 4/2011 | Brown et al. |
| 8,019,391 B2 | 9/2011 | Suzuki |
| 8,060,150 B2 | 11/2011 | Mendenhall et al. |
| 8,295,454 B2 | 10/2012 | Ron et al. |
| 8,384,555 B2 | 2/2013 | Rosen |
| 8,508,379 B2 | 8/2013 | Vander Veen et al. |
| 8,577,352 B1 | 11/2013 | Breiner |
| 8,731,530 B1 | 5/2014 | Breed et al. |
| 8,787,949 B2 | 7/2014 | Sumcad et al. |
| 8,799,032 B2 | 8/2014 | Fernandes et al. |
| 8,855,923 B2 | 10/2014 | Haavasoja |
| 9,086,948 B1 | 7/2015 | Slusar et al. |
| 9,357,054 B1 | 5/2016 | Froment et al. |
| 2007/0229234 A1 | 10/2007 | Smith |
| 2008/0262670 A1 | 10/2008 | McClellan et al. |
| 2008/0268767 A1 | 10/2008 | Brown et al. |
| 2008/0268769 A1 | 10/2008 | Brown et al. |
| 2008/0294302 A1 | 11/2008 | Basir |
| 2009/0082951 A1 | 3/2009 | Graessley |
| 2009/0085728 A1 | 4/2009 | Catten et al. |
| 2009/0215387 A1 | 8/2009 | Brennan et al. |
| 2009/0253423 A1 | 10/2009 | Kullberg |
| 2010/0035632 A1 | 2/2010 | Catten |
| 2010/0234047 A1 | 9/2010 | Lipovski et al. |
| 2010/0293090 A1 | 11/2010 | Domenikos et al. |
| 2010/0323657 A1 | 12/2010 | Barnard et al. |
| 2011/0021234 A1 | 1/2011 | Tibbitts et al. |
| 2011/0053506 A1 | 3/2011 | Lemke et al. |
| 2011/0076996 A1 | 3/2011 | Burton et al. |
| 2011/0136468 A1 | 6/2011 | McNamara et al. |
| 2011/0300843 A1 | 12/2011 | Miller et al. |
| 2012/0006611 A1 | 1/2012 | Wallace et al. |
| 2012/0013457 A1 | 1/2012 | Dowling |
| 2012/0053805 A1 | 3/2012 | Dantu |
| 2012/0071151 A1 | 3/2012 | Abramson et al. |
| 2012/0072243 A1 | 3/2012 | Collins et al. |
| 2012/0100827 A1 | 4/2012 | Bolin |
| 2012/0196544 A1 | 8/2012 | Bolingbroke |
| 2012/0244883 A1 | 9/2012 | Tibbitts et al. |
| 2012/0303392 A1 | 11/2012 | Depura et al. |
| 2012/0329520 A1 | 12/2012 | Akama |
| 2013/0070957 A1 | 3/2013 | Zhang et al. |
| 2013/0084847 A1 | 4/2013 | Tibbitts et al. |
| 2013/0265153 A1 | 10/2013 | Taylor et al. |
| 2013/0295900 A1 | 11/2013 | Hood |
| 2013/0336094 A1 | 12/2013 | Gruteser et al. |
| 2014/0019167 A1 | 1/2014 | Cheng et al. |
| 2014/0046701 A1 | 2/2014 | Steinberg et al. |
| 2014/0149145 A1 | 5/2014 | Peng et al. |
| 2014/0172467 A1 | 6/2014 | He et al. |
| 2014/0274023 A1 | 9/2014 | Rajeevalochana et al. |
| 2014/0278206 A1 | 9/2014 | Girod et al. |
| 2014/0310028 A1 | 10/2014 | Christensen et al. |
| 2015/0006099 A1 | 1/2015 | Pham et al. |
| 2015/0019266 A1 | 1/2015 | Stempora |
| 2016/0080557 A1 | 3/2016 | Sutton |
| 2017/0146801 A1 | 5/2017 | Stempora |

FOREIGN PATENT DOCUMENTS

| | | |
|---|---|---|
| EP | 2264988 A1 | 12/2010 |
| EP | 2541474 A1 | 1/2013 |
| KR | 20010107832 A | 12/2001 |
| KR | 20070088315 A | 8/2007 |
| WO | 03017208 A2 | 2/2003 |
| WO | 2013043228 A1 | 3/2013 |
| WO | 2014164329 A1 | 10/2014 |

OTHER PUBLICATIONS

"Find Google Maps coordinates—fast and easy!", MapCoordinates.net, retrieved Apr. 23, 2015 from <http://mapcoordinates.net/en>.
"Ten Ways Your Smartphone Knows Where You Are", Stephen Lawson, IDG News Service, Apr. 6, 2012.
"Sensing Vehicle Dynamics for Determining Driver Phone Use", Yan Wang et al., ACM 978-1-4503-1672, 2013.
"TransitHound In-Vehicle Cell Phone Detector", Berkeley Varitronics Systems, 2014, retrieved on Dec. 3, 2015 from <http://bvsystems.com/Products/Security.TransitHound/transithound.htm>.
"In-Vehicle Driver Detection Using Mobile Phone Sensors", Hon Lung Chu, Duke ECE, Apr. 20, 2011.
"CellAntenna Introduces Cell Phone Detection System to Prevent Passenger Train and Public Transportation Accidents", Enhanced Online News, May 26, 2010.
"Accelerometer-Based Transportation Mode Detection on Smartphones", Samuli Hemminki et al., ACM 978-1-4503-2027, Nov. 2013.
"Poster: You Driving? Talk to You Later", Hon Lung Chu et al., ACN 978-1-4503-0643, Jun. 28-Jul. 1, 2011, 1 page.
"Development and Evaluation of a Cellular Phone Based Teen Driver Support System: Final Report", Janet Creaser et al., HumanFIRST Program and Dept. of Mechanical Engineering, University of Minnesota, Report dated Aug. 2009, 101 pages.
"Ironclad GPC Tracking, Mobile Phone Tracking: Use and Benefits of Mobile Phone Trackers", Ironclad, retrieved May 9, 2013 from <www.ironcladgps.co.nz/mobile-phone-trackers-htm>, 2 pgs.
"User State Tracking Using Smartphones," by Mehmet S?nercan et al., Submitted to the Department of Computer Engineering, Bo?azici University, Jun. 2011, 23 pages.
"Mobile Phones as Traffic Probes: Practices, Prospects, and Issues", Geoff Rose, Transport Reviews (vol. 26, No. 3, pp. 275-291), May 2006.
Mobile Phone Location Determination and Its Impact on Intelligent Transportation Systems, Yilin Zhao, IEEE Transactions on Intelligent Transportation Systems (vol. 1, No. 1), Mar. 2000.
"Detecting Driver Phone Use Leveraging Car Speakers", Jie Yang et al., ACM 978-1-4503-0492, Sep. 19-23, 2011, pp. 1-12.
"Channel Characterization for Ultra-Wideband Intra-Vehicle Sensor Networks", IEEE Xplore, Oct. 2006, retrieved from <http://ieeexplore.ieee.org/xpl/login.jsp?reload=true&tp=&arnumber4086533&url=http%3A%2F%2Fieeexplore.ieee.org%2Fxpls%2Fabs_all.jsp%3Farnumber%3D4086533>.
"Inter- and Intra-Vehicle Communications", Gilbert Held, Auerbach Publications, ISBN-13:978-1-4200-5221-3, 2008.
Oct. 21, 2016—U.S. Final Office Action—U.S. Appl. No. 14/808,472.
Jan. 13, 2017—U.S. Non-Final Office Action—U.S. Appl. No. 14/808,472.
Jun. 29, 2017—U.S. Final Office Action—U.S. Appl. No. 14/808,472.
Sep. 22, 2017—U.S. Notice of Allowance—U.S. Appl. No. 14/808,472.
Jan. 25, 2018—U.S. Non-Final Office Action—U.S. Appl. No. 15/851,052.
Jul. 3, 2018—U.S. Notice of Allowance—U.S. Appl. No. 15/851,052.
Nov. 29, 2018—U.S. Non-Final Office Action—U.S. Appl. No. 16/130,607.
Mar. 22, 2019—U.S. Notice of Allowance—U.S. Appl. No. 16/130,607.

(1)

DETECTING HANDLING OF A DEVICE IN A VEHICLE

CROSS REFERENCE TO RELATED APPLICATIONS

This application is a continuation of U.S. patent application Ser. No. 16/130,607, filed Sep. 13, 2018, entitled "Detecting Handling of a Device in a Vehicle", which is a continuation of U.S. patent application Ser. No. 15/851,052, filed Dec. 21, 2017, entitled "Detecting Handling of a Device in a Vehicle", now U.S. Pat. No. 10,117,060 issued on Oct. 30, 2018, which is a continuation of U.S. patent application Ser. No. 14/808,472, filed Jul. 24, 2015, entitled "Detecting Handling of a Device in a Vehicle", now U.S. Pat. No. 9,888,392 issued on Feb. 6, 2018. Each of the aforementioned applications is incorporated herein by reference in its entirety.

TECHNICAL FIELD

Aspects of the disclosure generally relate to the detection of a device being handled in a vehicle using sensors and computing devices, which may be integrated into the device.

BACKGROUND

Drivers may use devices, such as mobile phones, while driving in their vehicles. Some uses while driving may be helpful, such as using a navigation application to navigate the driver to his or her destination. Some uses of the devices may be dangerous, such as if the driver is texting, playing a game, or taking a picture while driving. Accordingly, there is a need to detect whether a device is being handled in the vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices configured to provide an apparatus comprising an accelerometer configured to measure acceleration of the apparatus, a gyroscope configured to measure orientation of the apparatus, a processor, and memory. The memory may store computer-executable instructions that, when executed by the processor, cause the apparatus to determine, based on acceleration measurements made by the accelerometer over a period of time, an axis of gravity of the apparatus. The apparatus may determine, based on orientation measurements made by the gyroscope, a rotation vector of the apparatus. The apparatus may determine, based on the axis of gravity of the apparatus and the rotation vector of the apparatus, a rate of rotation of the apparatus perpendicular to the axis of gravity. If the rate of rotation of the apparatus perpendicular to the axis of gravity exceeds a threshold, the apparatus may determine that the apparatus is being used within a vehicle.

The memory may store computer-executable instructions that, when executed by the processor, cause the apparatus to determine that the apparatus is not being used within the vehicle if the rate of rotation of the apparatus perpendicular to the axis of gravity does not exceed the threshold. The apparatus may comprise a mobile device in some aspects. The axis of gravity of the apparatus may comprise a first axis of gravity of the apparatus. The memory may store computer-executable instructions that, when executed by the processor, cause the apparatus to determine a second axis of gravity of the apparatus. In response to a determination that the second axis of gravity differs from the first axis of gravity by more than a threshold amount, the apparatus may confirm that the apparatus is being used within the vehicle.

The memory may store computer-executable instructions that, when executed by the processor, cause the apparatus to determine a rate of rotation of the apparatus parallel to the axis of gravity. In response to a determination that the rate of rotation of the apparatus parallel to the axis of gravity exceeds a threshold rate of rotation, the apparatus may confirm that the apparatus is being used within the vehicle.

The memory may store computer-executable instructions that, when executed by the processor, cause the apparatus to determine an amount of lateral movement of the apparatus parallel to the axis of gravity. In response to a determination that the amount of lateral movement of the apparatus parallel to the axis of gravity exceeds a threshold amount of lateral movement, the apparatus may confirm that the apparatus is being used within the vehicle.

The memory may store computer-executable instructions that, when executed by the processor, cause the apparatus to determine whether the apparatus has received a wireless signal from a short-range transmitter in the vehicle. In response to determining that the apparatus has received the wireless signal from the short-range transmitter in the vehicle, the apparatus may confirm that the apparatus is being used within the vehicle.

In some aspects, a system may comprise a mobile device and a server. The mobile device may comprise an accelerometer configured to measure acceleration of the mobile device and an accelerometer configured to measure acceleration of the mobile device. The server may comprise a processor and memory storing computer-executable instructions that, when executed by the processor, cause the server to determine, based on acceleration measurements made by the accelerometer over a period of time, an axis of gravity of the mobile device. The server may determine, based on orientation measurements made by the gyroscope, a rotation vector of the mobile device. The server may determine, based on the axis of gravity of the mobile device and the rotation vector of the mobile device, a rate of rotation of the mobile device perpendicular to the axis of gravity. If the rate of rotation of the mobile device perpendicular to the axis of gravity exceeds a threshold, the server may determine that the mobile device is being used within a vehicle.

A method described herein may comprise determining, based on acceleration measurements made by an accelerometer of a device over a period of time, an axis of gravity of the device. The method may comprise determining, based on orientation measurements made by a gyroscope of the device, a rotation vector of the device. Based on the axis of gravity of the device and the rotation vector of the device, a rate of rotation of the device perpendicular to the axis of gravity may be determined. If the rate of rotation of the device perpendicular to the axis of gravity exceeds a threshold, the method may comprise determining that the device is being used within a vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
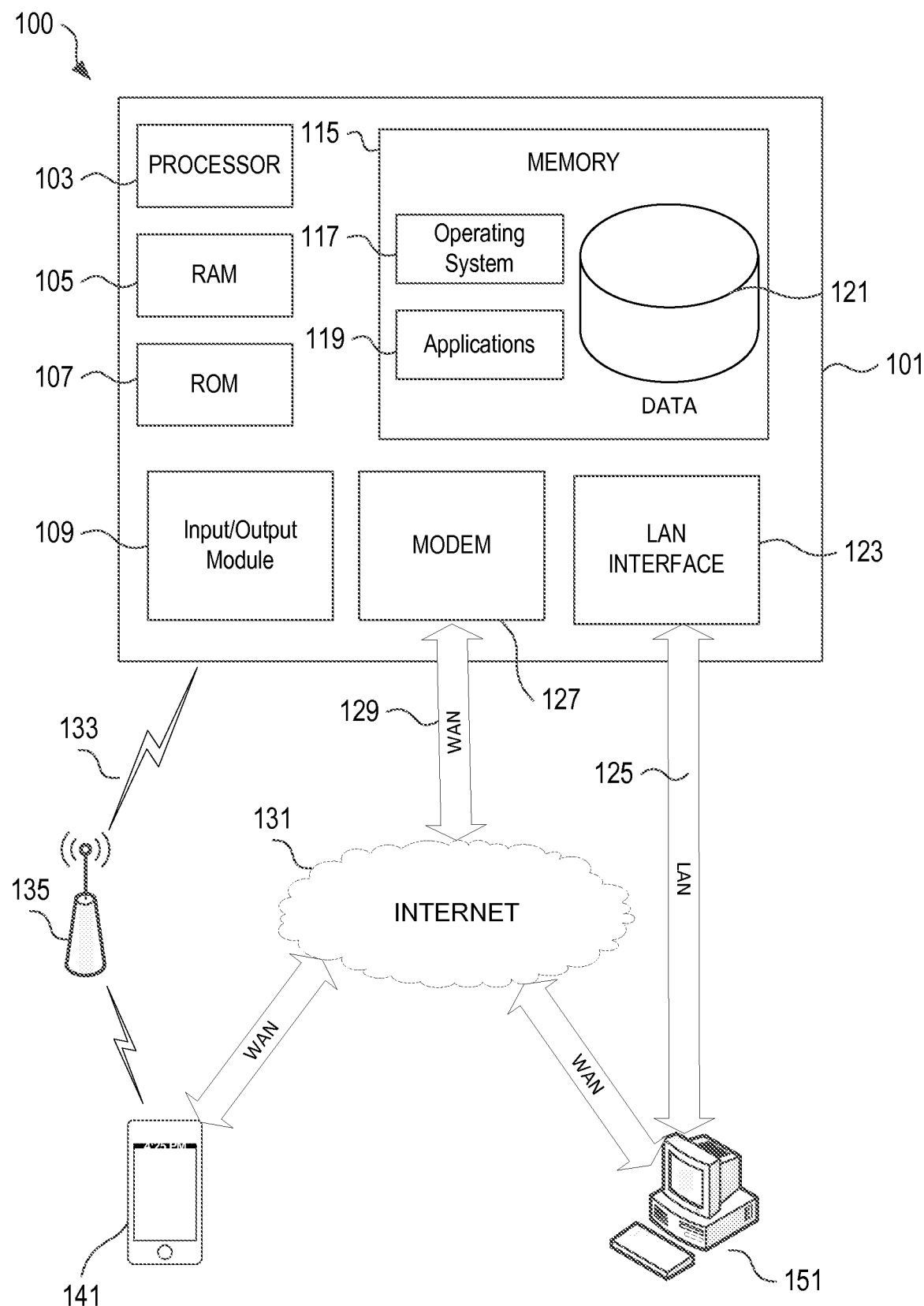
FIG. 1 illustrates a network environment and computing systems that may be used to implement aspects of the disclosure.

FIG. 1 illustrates a block diagram of a computing device 101 in a device handling detection system 100 that may be used according to one or more illustrative embodiments of the disclosure. The device handling detection computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as device handling detection computing devices or systems, configured as described herein for transmitting and receiving sensor data, detecting use of a device in the vehicle, and confirming that the device is being handled. Sensor data can include data collected from mobile devices (e.g., the driver's mobile phone), vehicle sensors, and/or on-board diagnostic (OBD) systems.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the device handling detection computing device 101 to execute a series of computer-readable instructions to transmit or receive sensor data, process sensor data, and determine or confirm device handling events from the sensor data.

The device handling detection computing device 101 may operate in a networked environment 100 supporting connections to one or more remote computers, such as terminals/devices 141 and 151. Device handling detection computing device 101, and related terminals/devices 141 and 151, may include devices installed in vehicles, mobile devices that may travel within vehicles, or devices outside of vehicles that are configured to receive and process vehicle and other sensor data. Thus, the device handling detection computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the device handling detection computing device 101. The network connections depicted in FIG. 1 include a local area network (LAN) 125 and a wide area network (WAN) 129, and a wireless telecommunications network 133, but may also include other networks. When used in a LAN networking environment, the device handling detection computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and device handling detection system components described herein may be configured to communicate using any of these network protocols or technologies.

Additionally, one or more application programs 119 used by the device handling detection computing device 101 may include computer executable instructions (e.g., sensor data analysis programs, device handling detection algorithms, and the like) for transmitting and receiving sensor and device handling data and performing other related functions as described herein.

Sensor data may refer to information pertaining to one or more actions or events performed by a vehicle and can include aspects of information identified or determined from data collected from a vehicle or mobile device. Sensor data can include, for example, location data, acceleration data, time data, direction data, mobile device orientation data, rotation/gyroscopic data, and the like.

Figure 2:
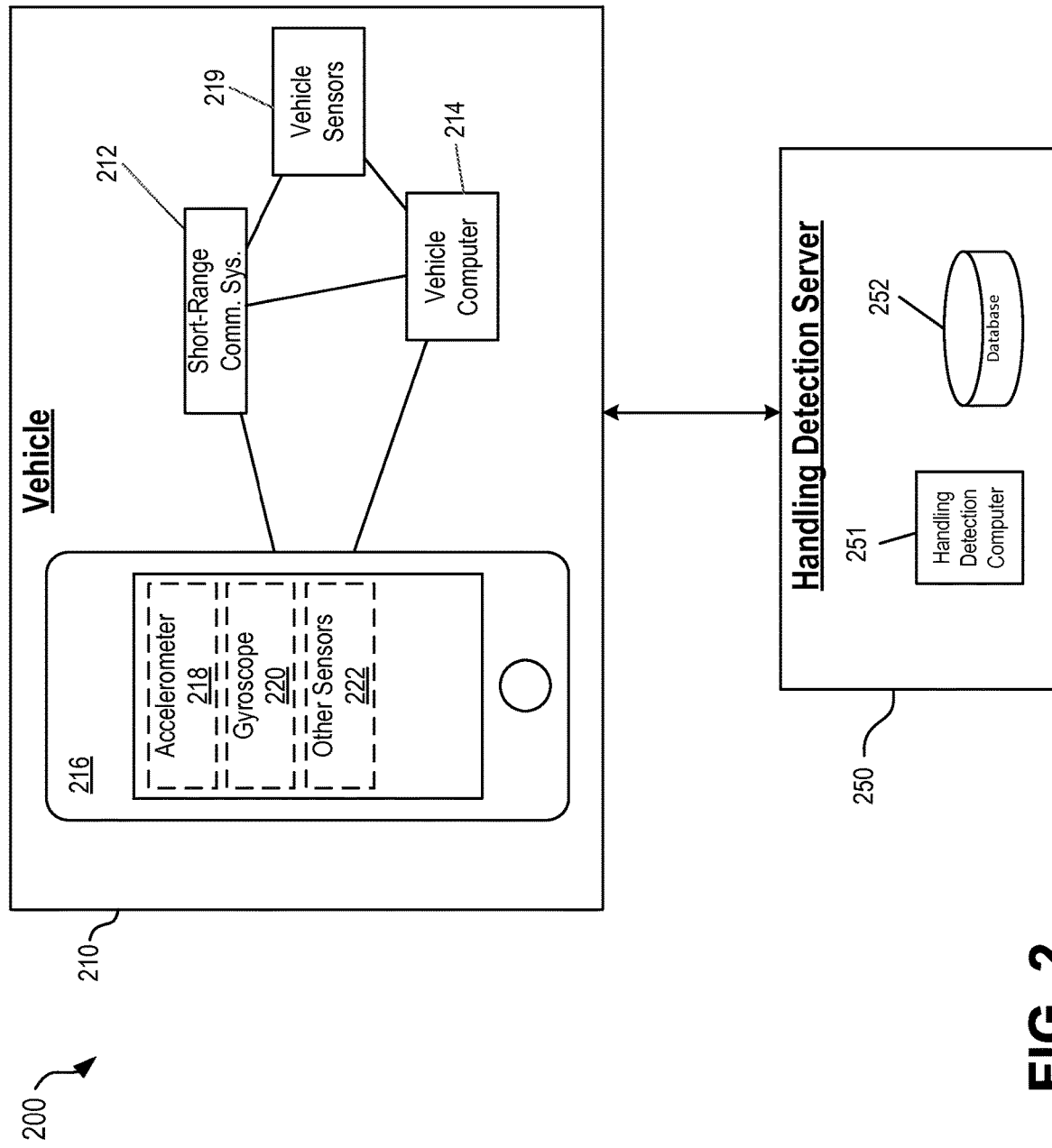
FIG. 2 is a diagram illustrating various example components of a device handling detection system according to one or more aspects of the disclosure.

FIG. 2 is a diagram illustrating various example components of a device handling detection system 200 according to one or more aspects of the disclosure. The device handling system 200 may include a vehicle 210, a mobile computing device 216, other vehicles (not illustrated), a handling detection server 250, and additional related components. Each component shown in FIG. 2 may be implemented in hardware, software, or a combination of the two. Additionally, each component of the device handling system 200 may include a computing device (or system) having some or all of the structural components described above for computing device 101. For example, the mobile computing device 216 may comprise a processor 103 configured to receive sensor data from the accelerometer 218, the gyroscope 220, and other sensors 222. The processor 103 of the mobile computing device 216 may process the received sensor data to determine whether the mobile computing device 216 is being handled within a vehicle. As another example, the handling detection computer 251 may comprise a processor 103 configured to receive sensor data from the accelerometer 218, the gyroscope 220, and other sensors 222 of the mobile computing device 216. The processor 103 of the handling detection computer 251 may process the received sensor data to determine whether the mobile computing device 216 is being handled within the vehicle. Other examples of the interaction among various components of the device handling system 200 will be described below.

Vehicle 210 may be, for example, an automobile, motorcycle, scooter, bus, recreational vehicle, boat, or other vehicle for which sensor or device handling data may be collected and analyzed. A mobile computing device 216 within the vehicle 210 may be used to collect sensor or device handling data (e.g., via accelerometer 218, gyroscope 220, or other sensors 222, such as a camera or microphone) and/or to receive sensor or device handling data from the vehicle 210 (e.g., via vehicle sensors 219). The mobile device 216 may process the data to detect that the device is being handled in the vehicle and/or to transmit the sensor or device handling data to the handling detection server 250 or other external computing devices. Mobile computing devices 216 may be, for example, mobile phones, personal digital assistants (PDAs), tablet computers, laptop computers, smartwatches, and other devices that may be carried by drivers or passengers inside or outside of the vehicle 210. The mobile computing device 216 may contain some or all of the hardware/software components as the computing device 101 depicted in FIG. 1.

Software applications executing on the mobile device 216 may be configured to receive sensor data from the accelerometer 218 (e.g., acceleration data), gyroscope 220 (e.g., rotation data, such as speed of rotation data), and other sensors 222 (e.g., a captured image or recorded audio) and/or communicate with vehicle sensors 219 or other vehicle communication systems to sense or receive driving data. When mobile computing device 216 within the vehicle 210 is used to sense rotation, acceleration, and other data, the mobile computing device 216 may store, analyze, and/or transmit the data to one or more other computing devices. For example, mobile device 216 may transmit data directly to handling detection server 250, and thus may be used instead of sensors or communication systems of the vehicle 210.

The data collected by the mobile device 216 may be stored and/or analyzed within the mobile device 216. The processing components of the mobile computing device 216 may be used to analyze sensor data, determine whether or not the device 216 is being handled by a user, and confirm whether or not the device 216 is being handled. Additionally or alternatively, the mobile device 216 may transmit, via a wired or wireless transmission network, the data to one or more external devices for storage or analysis, such as vehicle computer 214 or handling detection server 250. In other words, mobile computing device 216 may be used in conjunction with, or in place of, the vehicle computer 214 or handling detection server 250 to detect whether the device 216 is being handled in the vehicle.

The vehicle computer 214 of the vehicle 210 may contain some or all of the hardware/software components as the computing device 101 depicted in FIG. 1. The vehicle computer 214 may receive sensor or device handling data from the mobile device 216. For example, vehicle computer 214 may receive accelerometer data from the mobile device 216 and use the accelerometer data to determine, for example, the direction of gravity. The vehicle computer 214 may also receive data from a gyroscope of the device 216 to determine, for example, the rate of rotation of the device 216. This information may be used to determine whether the device 216 is being handled by a user, as will be described in further detail below. Additionally or alternatively, the vehicle computer 214 may act as a gateway device between the mobile device 216 and the handling detection server 250. For example, the vehicle computer 214 may receive sensor data (or data indicating that the device 216 is being handled) from the mobile device 216 and forward the received data to the handling detection server 250. The vehicle 210 may include a short-range communication system or devices 212, which will be described in further detail below.

The system 200 may include a handling detection server 250, containing some or all of the hardware/software components as the computing device 101 depicted in FIG. 1. The handling detection server 250 may include hardware, software, and network components to receive data from one or more vehicles 210 (e.g., via vehicle computer 214), mobile device 216, and other data sources. The handling detection server 250 may include a driving and driver data database 252 and handling detection computer 251 to respectively store and analyze data received from vehicles, mobile devices, and other data sources. The handling detection server 250 may initiate communication with and/or retrieve data from vehicle 210 wirelessly via vehicle computer 214, mobile device 216, or by way of separate computing systems over one or more computer networks (e.g., the Internet).

The handling detection computer 251 may be configured to retrieve data from the database 252, or may receive data directly from vehicle 210, mobile device 216, or other data sources. The handling detection computer 251 may perform device handling detection analyses and other related functions, as will be described in further detail in the examples below. The analyses described herein may be performed entirely in the handling detection computer 251 of the handling detection server 250, entirely in the vehicle computer 214, or entirely in the mobile device 216. In other examples, certain analyses may be performed by vehicle computer 214, other analyses may be performed by the handling detection computer 251, and yet other analyses may be performed by the mobile device 216.

Short-range communication system 212 is a vehicle-based data transmission system configured to transmit vehicle data to other nearby vehicles, and to receive vehicle data from other nearby vehicles. In some examples, communication system 212 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the short-range communication system 212 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The V2V transmissions between the short-range communication system 212 and another vehicle's communication system may be sent via DSRC, Bluetooth, satellite, GSM infrared, IEEE 802.11, WiMAX, RFID, and/or any suitable wireless communication media, standards, and protocols. In certain systems, the short-range communication system 212 may include specialized hardware installed in vehicle 210 (e.g., transceivers, antennas, etc.), while in other examples the communication system 212 may be implemented using existing vehicle hardware components (e.g., radio and satellite equipment, navigation computers) or may be implemented by software running on the mobile device 216 of drivers and passengers within the vehicle 210.

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle data to the other vehicles and/or devices.

The types of vehicle data transmitted by the vehicle 210 may depend on the protocols and standards used for the V2V communication, the range of communications, whether device handling has been detected, and other factors. In certain examples, the vehicle 210 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 210 internal systems that the vehicle is skidding, that an impact has occurred, or that the vehicle's airbags have been deployed, also may be transmitted in V2V communications.

The mobile computing device 216 may be used instead of, or in conjunction with, short-range communication system 212. For example, the mobile device 216 may communicate directly with the other vehicle or directly with another mobile device, which may be inside or outside of the other vehicle. Additionally or alternatively, the other vehicle may communicate location information to vehicle 210, and vehicle 210 may in turn communicate this location information to the mobile device 216. Any data collected by any vehicle sensor or mobile device 216 sensor may be transmitted via V2V or other communication to other nearby vehicles, mobile devices, or infrastructure devices receiving V2V communications from communication system 212 or communications directly from mobile device 216. Further, additional vehicle driving data not from the vehicle's sensors (e.g., vehicle make/model/year information, driver information, etc.) may be collected from other data sources, such as a driver's or passenger's mobile device 216, handling detection server 250, and/or another external computer system, and transmitted using V2V communications to nearby vehicles and other transmitting and receiving devices using communication system 212.

Systems and methods described herein may detect whether a device within a vehicle, such as the mobile computing device 216, is being handled or otherwise used. For example, a user handling the device 216 may be distinguished from the vehicle 210 making a turn based on data collected from sensors, such as a gyroscope or an accelerometer. The computing device 101 (which may be mobile computing device 216) may determine the direction of gravity relative to the mobile device 216. While a vehicle generally rotates about the axis of gravity (e.g., during a turn), the mobile device 216 within the vehicle may rotate about any axis. Accordingly, whether the mobile device 216 is being handled may be determined based on a comparison of the rate of rotation of the mobile device 216 about an axis perpendicular to the axis of gravity to a threshold perpendicular rotation. The previous description is merely exemplary, and additional examples of the device handling detection system 200 and methods performed by the system are described below.

Figure 3:
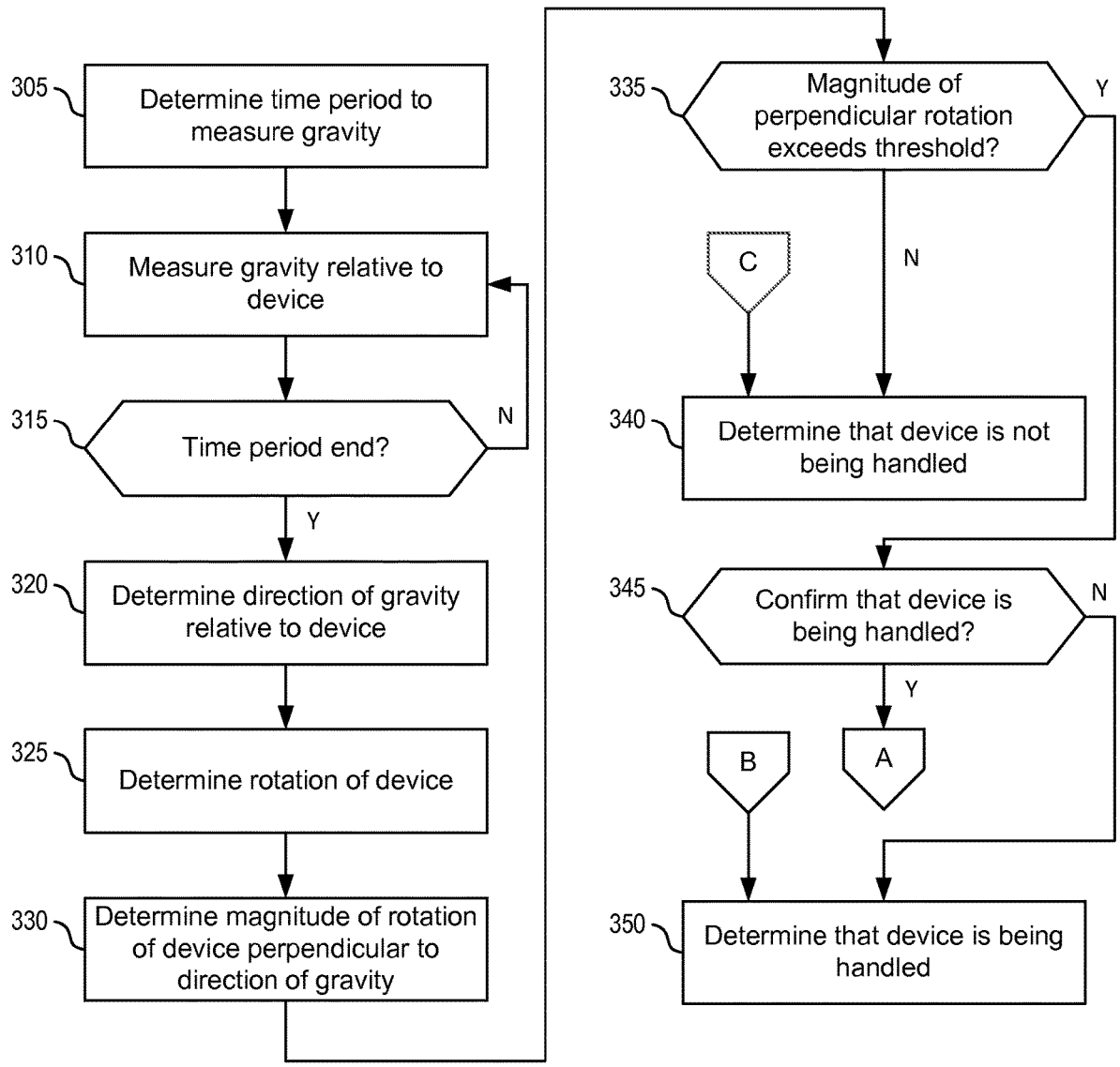
FIG. 3 is a flow diagram illustrating an example method of detecting that a device is being handled in a vehicle according to one or more aspects of the disclosure.

FIG. 3 is a flow diagram illustrating an example method of detecting that a device 216 is being handled in a vehicle according to one or more aspects of the disclosure. The steps illustrated in FIG. 3 may be performed by a computing device, such as the mobile computing device 216, the vehicle computer 214, and/or the handling detection computer 251. For the sake of brevity, the steps illustrated in FIG. 3 will be described as being performed by the mobile computing device 216. The acceleration and rotation data used to make the determination may be sensed, respectively, by an accelerometer of the mobile computing device 216 and a gyroscope of the mobile computing device 216.

In step 305, a computing device may determine a time period used to measure gravity. The time period may be preconfigured in the computing device. For example, the time period may comprise 10 seconds, 100 seconds or any other time period. In some aspects, the computing device may set the time period for taking gravity measurements to occur during a period of time that the vehicle is expected to traverse over a relatively flat area (e.g., with little elevation or altitude change). For example, the computing device may determine its current elevation based on Global Positioning System (GPS) satellites, such as by determining the distance between one or more satellites and the computing device. The computing device may also determine its current elevation using a barometer. The barometer may be used to measure the air pressure at the computing device. The air pressure may be higher at a lower elevation and lower at a higher elevation (e.g., pressure above sea level is lower than the pressure at sea level). The computing device may also access a database storing elevation information and correlating the elevation information to locations around the world. In particular, the computing device may provide its current location (e.g., longitude and latitude, as measured by GPS, cellular towers, Wi-Fi gateways, etc.) to the database, and the database may return the corresponding elevation to the computing device.

The computing device may determine whether a change in elevation of the mobile device in the future is expected to exceed a threshold. For example, the computing device may determine the rate of change of the elevation based on two or more consecutive elevation measurements made by the GPS and/or barometer. If the rate of change of elevation does not exceed a threshold (indicating that the vehicle is not significantly changing elevation, such as climbing a hill or going downhill), the computing device may determine that it may make gravity measurements during a time period, as will be described below. The computing device may also track the route of the vehicle and determine, based on information provided by the database correlating location to elevation, whether the vehicle's elevation will change by more than a threshold amount for a certain amount of time in the future. If not, the computing device may make gravity measurements during a time period, as will be described below. Otherwise, the computing device might wait for another window to take gravity measurements.

In step 310, the computing device may measure gravity relative to the computing device, using, for example an accelerometer of the computing device. The computing device may make these measurements during the selected time period, such as periodically during the time period (e.g., every 100 milliseconds during a 10 second period). The accelerometer may constantly register 1 gravity of force (1G) due to the earth's gravitational pull. In step 315, the computing device may determine whether the time period has ended. If not (step 315: N), the computing device may continue to measure gravity at a predetermined rate. If the time period has ended (step 315: Y), the computing device may proceed to step 320.

In step 320, the computing device may determine the direction of gravity relative to the computing device based on the measurements made during the selected time period (e.g., measurements made during a 10 second window). The computing device may take the average of acceleration measurements to determine the average magnitude and direction of gravity. The computing device may then divide the average of the acceleration measurements by the magnitude of the acceleration measurement to calculate a unit vector $\hat{g}$, which is the direction of gravity having an x direction component, a y direction component, and a z direction component, as indicated in the following expression.

$$\hat{g}=(g_x,g_y,g_z)$$

The computing device may additionally or alternatively determine the direction of gravity by taking a plurality of readings, which may comprise gravity and noise components. The computing device may apply a low pass filter to remove the noise components. Moreover, the direction of gravity relative to the computing device may be recalculated at any point in time. For example, the computing device may recalculate the direction of gravity if it has been determined that the computing device was handled or has accelerated enough to have changed position, as will be described in further detail below. After a significant acceleration (e.g., acceleration that exceeds a threshold acceleration), the computing device may have moved and consequently the direction of gravity may have changed. The computing device may recalculate the direction of gravity after such a move by the device.

In step 325, the computing device may determine the rotation (also referred to as angular velocity) of the computing device, $\vec{\omega}$, which may comprise a vector having a particular length. The computing device may determine the rotation $\vec{\omega}$ using a gyroscope. The rotation $\vec{\omega}$ may have an x direction component, a y direction component, and a z component direction, as indicated in the following expression.

$$\vec{\omega}=(\omega_x,\omega_y,\omega_z)$$

The rotation vector may identify the rotation of the computing device about each axis (x axis, y axis, and z axis). The rotation (or angular velocity) $\vec{\omega}$ may comprise a vector component parallel to the direction of gravity, $\vec{\omega}_{parallel}$, and a vector component perpendicular to the direction of gravity, $\vec{\omega}_{perp}$, as indicated in the following expression.

$$\vec{\omega}=\vec{\omega}_{perp}+\vec{\omega}_{parallel}$$

In step 330, the computing device may determine the magnitude of rotation of the computing device, $\|\vec{\omega}_{perp}\|$, that is perpendicular to the direction of gravity. The component perpendicular to the direction of gravity, $\vec{\omega}_{perp}$, may be used to determine whether the computing device is being handled, as indicated in the following expression.

$$\vec{\omega}_{perp}=\vec{\omega}-\vec{\omega}_{parallel}$$

The dot product of a vector and a unit vector is the length of the vector that lies in the direction of the unit vector. Accordingly, the rate of rotation parallel to (or along) the axis of gravity ($\vec{\omega}_{parallel}$) may comprise the dot product of the rotation vector with $\hat{g}$, as indicated in the following expression.

$$\vec{\omega}_{perp} = \vec{\omega} - (\vec{\omega} \cdot \hat{g}) * \hat{g}$$

The computing device may determine the magnitude of the rotation perpendicular to the direction of gravity ($\|\vec{\omega}_{perp}\|$) as follows:

$$\|\vec{\omega}_{perp}\| = \|\vec{\omega} - \vec{\omega}_{parallel}\|$$

$$\|\vec{\omega}_{perp}\| = \|\vec{\omega} - (\vec{\omega} \cdot \hat{g}) * \hat{g}\|$$

$$\|\vec{\omega}_{perp}\| = \sqrt{\sum_{x,y,z} [\omega_i - (\omega_x * g_x + \omega_y * g_y + \omega_z * g_z) * g_i]^2}$$

In other words, the computing device may compute the sum over the x, y, and z components to determine the length of the vector $\vec{\omega}_{perp}$.

In step 335, the computing device may determine whether the magnitude (or length) of rotation perpendicular to the direction of gravity ($\|\vec{\omega}_{perp}\|$) exceeds a threshold. In other words, the computing device may use the magnitude of rotation perpendicular to the direction of gravity to distinguish between the computing device being handled and other types of motion. Various models may be used to distinguish between handling and non-handling events. An exemplary threshold value may be 2 radians/second. If the magnitude does not exceed the threshold (step 335: N), the computing device may determine, in step 340, that the computing device is not being handled by a user. On the other hand, if the magnitude exceeds the threshold (step 335: Y), the computing device may optionally determine, in step 345, whether to confirm that the computing device is being handled by the user. If not (step 345: N), the computing device may determine that the computing device is being handled by the user in step 350. If the computing device determines to confirm that the device is being handled (step 345), the computing device may proceed to perform one or more of the steps illustrated in FIG. 4.

Figure 4:
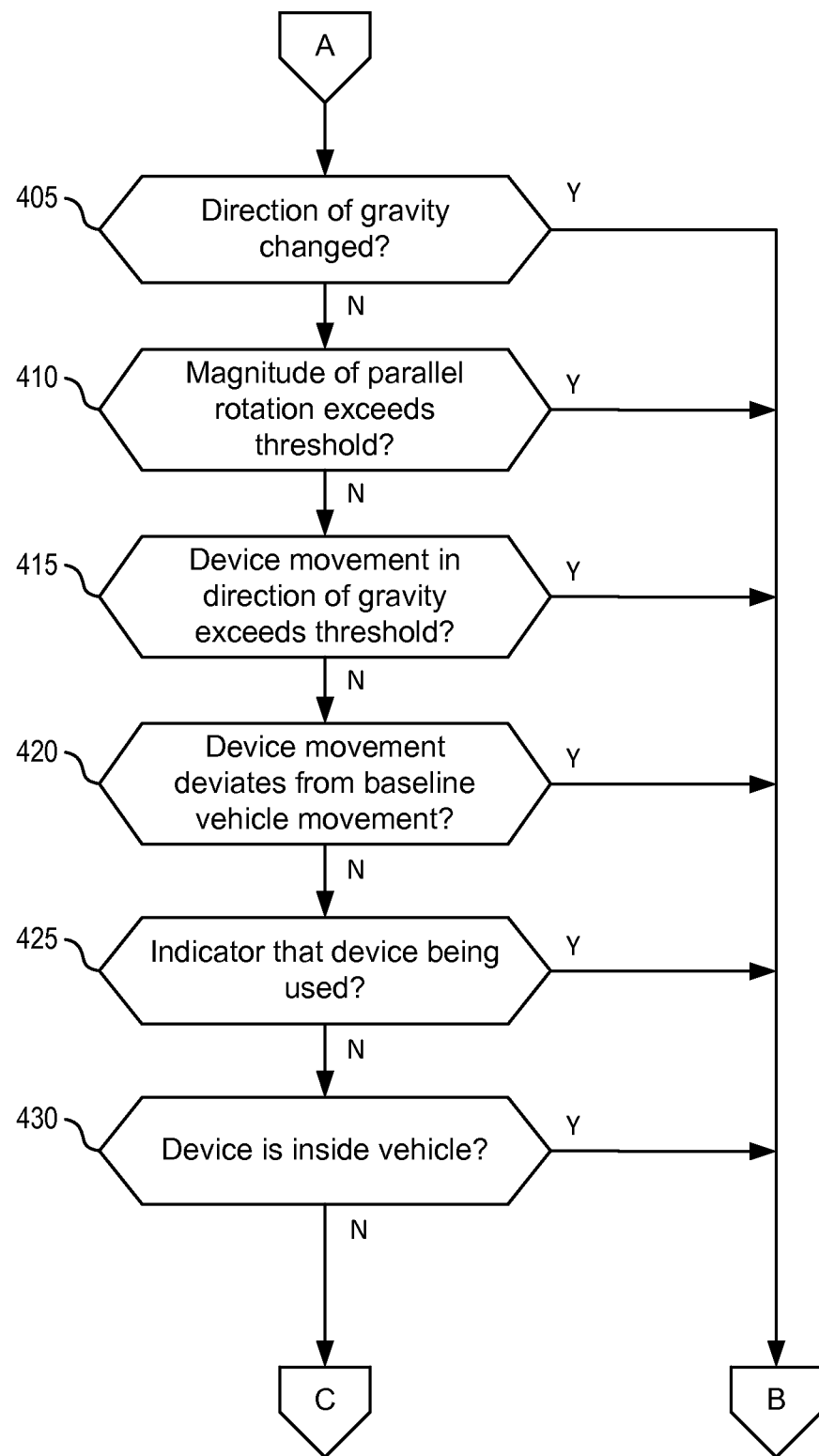
FIG. 4 is a flow diagram illustrating an example method of confirming that a device is being handled in a vehicle according to one or more aspects of the disclosure.

FIG. 4 is a flow diagram illustrating an example method of confirming that a device is being handled in a vehicle according to one or more aspects of the disclosure. The steps illustrated in FIG. 4 may be performed by a computing device, such as the mobile computing device 216, the vehicle computer 214, and/or the handling detection computer 251. For the sake of brevity, the steps illustrated in FIG. 4 will be described as being performed by the mobile computing device 216.

In step 405, the computing device may determine whether the direction of gravity has changed relative to the baseline direction of gravity determined in step 320. An accelerometer of the computing device may be used to determine the current direction of gravity. If the current direction of gravity deviates from the baseline direction of gravity by a threshold (step 405: Y), the computing device may determine that the computing device is being handled in step 350. The threshold may comprise an angle, such as $$\frac{\pi}{8}$$

radians, and the computing device may determine that the device is being handled if the change in direction of gravity exceeds $$\frac{\pi}{8}$$

radians. The threshold may additionally or alternatively be measured by the dot product of vectors, which as explained above may comprise unit vectors. The dot product of the threshold angle of $$\frac{\pi}{8}$$

radians may be $$\cos\left(\frac{\pi}{8} \text{ radians}\right)$$

or 0.92. The computing device may determine that the device is being handled if the dot product of the gravity vectors exceeds 0.92. The angle of $$\frac{\pi}{8}$$

radians is exemplary, and the computing device may use any change in angle to confirm that the device is being handled. If the current direction of gravity does not deviate from the baseline direction of gravity by more than a threshold (step 405: N), the computing device may optionally proceed to step 410 to confirm handling of the device using another method.

In step 410, the computing device may determine whether the magnitude of rotation parallel to (in the direction of) the direction of gravity exceeds a threshold. When a vehicle turns, it rotates about an axis parallel to the direction of gravity. As such, a mere rotation in the direction of gravity of the computing device (which may be inside the vehicle) would not necessarily indicate that the computing device is being handled. However, a rotation of the computing device in the direction of gravity beyond the rate of rotation typically caused by the vehicle turning may indicate that the parallel rotation is being caused by a user handling the computing device and not the vehicle turning. Accordingly, a threshold rate of rotation in the direction of gravity may be used to confirm that the computing device is being handled.

The magnitude of rotation parallel to the direction of gravity ($\|\vec{\omega}_{parallel}\|$) may be expressed as follows:

$$\|\vec{\omega}_{parallel}\| = \|(\vec{\omega} \cdot \hat{g}) * \hat{g}\|$$

As previously explained, a gyroscope of the computing device may be used to determine the rotation of the computing device. The computing device may compare the magnitude of rotation parallel to the direction of gravity to a threshold magnitude. For example, the threshold magnitude may be 3 radians/second (or any other value). If it exceeds the threshold (step 410: Y), the computing device may determine that the computing device is being handled in step 350. On the other hand, if the magnitude of rotation parallel to the direction of gravity does not exceed the threshold (step 410: N), the computing device may optionally proceed to step 415 to confirm handling of the device using another method.

In step 415, the computing device may determine whether movement in the direction of gravity (e.g., lateral to the direction of gravity) exceeds a threshold. In particular, the computing device may compare the current magnitude of gravity ($\vec{g}$) with the magnitude of gravity previously measured by the accelerometer of the computing device. If the current magnitude exceeds the magnitude of gravity previously measured by more than a threshold amount (step 415: Y), this indicates that acceleration has occurred along the direction of gravity and the computing device may determine that the computing device is being handled in step 350. An exemplary threshold value may be $$2\frac{m}{s^2}.$$

Otherwise (step 415: N), the computing device may optionally proceed to step 420 to confirm handling of the device using another method. Significant movement in the direction of gravity may indicate device handling because vehicles typically do not move significantly in the direction of gravity.

In step 420, the computing device may determine whether movement of the device deviates from a baseline movement of the vehicle. The computing device may retrieve a previous driving pattern for the vehicle. The previous driving pattern may have been measured by a device in the vehicle or the vehicle's sensors. If the current movement of the computing device deviates from the previous driving pattern for the vehicle by more than a threshold amount (step 420: Y), the computing device may determine that the computing device is being handled in step 350. Otherwise (step 420: N), the computing device may optionally proceed to step 425 to confirm handling of the device using another method. Machine learning techniques performed on vehicle data may be used to reveal typical ways in which vehicles accelerate and rotate. For example, when a driver makes a right turn, the driver usually slows down before the turn starts and accelerates during the turn. If the computing device detected a signal that looked like a typical right turn, but acceleration occurred before the turn started, the computing device may determine that this was not actually a right turn, but device handling. The comparison may be made by generating metrics to those described above and using them to define a typical driving pattern, and a difference measurement may be used to determine when the vehicle deviated from the typical driving pattern.

In step 425, the computing device may determine whether an indicator indicates that the computing device is otherwise being used. The computing device may track whether a particular application on the computing device is active (or otherwise being used). For example, the computing device may determine whether a texting application on the device is open or otherwise being used. The computing device may determine whether a game application on the device is open or otherwise being used. The computing device may make the same determination for other applications that typically should not be used while driving, such as an email application, a voice application, a news application, a social media application, a camera application, etc. The computing device may additionally or alternatively determine whether a user is interacting with the computing device, such as by pressing or otherwise providing input to a touchscreen display of the computing device. If a particular application is being used or a user is interacting with the computing device (step 425: Y), the computing device may determine that the computing device is being handled in step 350. Otherwise (step 425: N), the computing device may optionally proceed to step 430 to confirm handling of the device using another method.

In step 430, the computing device may determine whether the computing device is inside a vehicle. The computing device may determine that the computing device is inside the vehicle based on a communication (e.g., a handshake) between the computing device and the vehicle. The communication may be made via a short-range wireless transmission, such as Bluetooth (e.g., Bluetooth Low Energy). A Bluetooth beacon may be placed inside or on the vehicle, such as on the visor, on a mobile device cradle within the car, in an owner's manual that is typically placed in the dashboard, in the dashboard, on the license plate, on a car seat, or anywhere else within or on the vehicle. In some aspects, components in the vehicle, such as on-board sensors/transmitters, may have built-in Bluetooth capabilities. The short-range wireless transmitter may transmit any signal that identifies the vehicle (e.g., a VIN, license plate number, make/model/year, etc.) and/or that the computing device is otherwise within range (e.g., inside) of the vehicle. If the computing device determines that it is inside the vehicle based on the received signal (step 430: Y), the computing device may determine that the computing device is being handled in step 350. Otherwise (step 430: N), the computing device may determine that the computing device is not being handled in step 340 (e.g., that it cannot confirm that the device is being handled).

The computing device may use other sensors in the computing device, such as a microphone or a camera to determine that the computing device is inside a vehicle in step 430. For example, the computing device may turn on its microphone and listen for vehicle noises, such as engine sounds or sounds caused by the turn signal. As another example, the computing device may capture an image with its camera and determine whether the image corresponds to an interior of the vehicle, such as a vehicle seat, a vehicle dashboard, a steering wheel, a headrest, a vehicle door frame, etc. If the audio captured by the microphone or the image captured by the camera indicate that the computing device is inside the vehicle (step 430: Y), the computing device may determine that the computing device is being handled in step 350. Otherwise (step 430: N), the computing device may determine that the computing device is not being handled in step 340 (e.g., that it cannot confirm that the device is being handled).

In addition to determining whether the device is inside the vehicle, the computing device may determine whether the driver or a passenger is handling the device. For example, the computing device may determine which beacon inside or on the vehicle is the closest beacon. If, for example, the beacon on the driver's visor is the closest beacon, the computing device may determine that the driver is handling the device. On the other hand, if the beacon near the rear end of the vehicle is the closest or in the front passenger compartment is the closest beacon, the computing device may determine that a passenger is handling the device. The computing device may similarly use the microphone or camera to determine whether the passenger or driver is handling the device. In general, a passenger handling the device is okay, but a driver handling the device while driving is not okay. Accordingly, the computing device may determine that the computing device is being handled in step 350 if it determines that the driver is handling the device. Otherwise, the computing device may determine that the computing device is not being handled in step 340 if it determines that a passenger is handling the device.

Any of the determinations previously described in steps 335, 405, 410, 415, 420, 425, and 430 may be used to make the initial determination of whether the computing device is being handled in a vehicle. Similarly, any one or more of these determinations may optionally be performed to confirm (after the initial determination) that the computing device is being handled in the vehicle.

A computing device may use device handling data for various purposes. First, the computing device may perform various determinations in response to determining that the device was handled (e.g., step 350). The computing device may determine whether the vehicle was moving while the device was being handled. For example, the computing device may use GPS, cellular towers, Wi-Fi gateways, and the like to determine whether the vehicle was moving and/or the speed at which the vehicle was moving at the time of the handling event. If the vehicle was moving (or was moving at a speed greater than a threshold speed, such as 10 MPH), the computing device may use the information to adjust an insurance policy and/or risk rating for the vehicle owner. The computing device may also determine the frequency of handling events per mile, per hour, and/or per trip. The frequency may also be used to adjust the insurance policy and/or risk rating. The device handling data may also be used to identify false positives in crash detection. For example, if a crash is detected, the computing device may check the device handling data to confirm (or not) the crash.

The computing device, such as the mobile device, may communicate to nearby vehicles or drivers (e.g., within a threshold radius or distance) that the mobile device is being handled. For example, the mobile device may send a notification to other nearby mobile devices of vehicle devices. A central computing device may additionally or alternatively receive the handling data from the mobile device and send the notification to mobile devices or vehicle devices of nearby drivers. Accordingly, other drivers may be warned of potential unsafe driving.

A computing device, such as the mobile device, may perform various determinations in response to determining that the device was not handled (e.g., step 340). For example, in response to determining that the device is not being handled (and thus remains relatively stationary in the vehicle), the mobile device (or other computing device) may be used to detect braking events for the vehicle. The mobile device may determine a rotation matrix used to align the mobile device's coordinate system with the vehicle's coordinate system. The mobile device may then monitor for a large acceleration (e.g., greater than a threshold) in the direction backwards from the driver.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
   determining, by a computing device, based on a direction of gravity of an apparatus and a rotation vector of the apparatus, a rate of rotation of the apparatus perpendicular to the direction of gravity;
   based on a determination that the rate of rotation of the apparatus perpendicular to the direction of gravity exceeds a first threshold,
   determining if a rate of rotation of the apparatus parallel to the direction of gravity exceeds a rate of rotation caused by turning of a vehicle within which the apparatus is located; and
   based on determining that the rate of rotation of the apparatus parallel to the direction of gravity exceeds the rate of rotation caused by turning of the vehicle, determining that the apparatus is being used within the vehicle.

2. The method of claim 1, wherein the direction of gravity of the apparatus is determined based on acceleration measurements made by an accelerometer over a period of time.

3. The method of claim 1, wherein the rate of rotation of the apparatus perpendicular to the direction of gravity is determined based on orientation measurements made by a gyroscope.

4. The method of claim 1, wherein the determining that the apparatus is being used within the vehicle is further based on determining if a change of the direction of gravity exceeds a predetermined angle.

5. The method of claim 1, wherein the determining that the apparatus is being used within the vehicle is further based on determining if an amount of lateral movement of the apparatus parallel to the direction of gravity exceeds a second threshold.

6. The method of claim 4, wherein the determining if the change of the direction of gravity exceeds the predetermined angle comprises:
   determining if a current direction of gravity deviates from a baseline direction of gravity by a third threshold.

7. The method of claim 1, further comprising:
   determining, after determining that the rate of rotation of the apparatus perpendicular to the direction of gravity exceeds the first threshold and prior to the determining if the rate of rotation of the apparatus parallel to the direction of gravity exceeds the rate of rotation caused by turning of the vehicle, to take one or more additional steps to confirm that the apparatus is being handled within the vehicle.

8. An apparatus comprising:
   a processor; and
   memory storing computer-executable instructions that, when executed by the processor, cause the apparatus to:
   determine, based on a direction of gravity of the apparatus and a rotation vector of the apparatus, a rate of rotation of the apparatus perpendicular to the direction of gravity;
   based on a determination that the rate of rotation of the apparatus perpendicular to the direction of gravity exceeds a first threshold, determine if a rate of rotation of the apparatus parallel to the direction of gravity exceeds a rate of rotation caused by turning of a vehicle within which the apparatus is located; and
   based on determining that the rate of rotation of the apparatus parallel to the direction of gravity exceeds the rate of rotation caused by turning of the vehicle, determine that the apparatus is being used within the vehicle.

9. The apparatus of claim 8, wherein the direction of gravity of the apparatus is determined based on acceleration measurements made by an accelerometer over a period of time.

10. The apparatus of claim 8, wherein the rate of rotation of the apparatus perpendicular to the direction of gravity is determined based on orientation measurements made by a gyroscope.

11. The apparatus of claim 8, wherein the memory storing computer-executable instructions that cause the apparatus to determine that the apparatus is being used within the vehicle, when executed by the processor, further cause the apparatus to:

determine, based on determining if a change of the direction of gravity exceeds a predetermined angle, that the apparatus is being used within the vehicle.

12. The apparatus of claim 8, wherein the memory storing computer-executable instructions that cause the apparatus to determine that the apparatus is being used within the vehicle, when executed by the processor, further cause the apparatus to:

determine, based on determining if an amount of lateral movement of the apparatus parallel to the direction of gravity exceeds a second threshold, that the apparatus is being used within the vehicle.

13. The apparatus of claim 11, wherein the memory storing computer-executable instructions that cause the apparatus to determine if the change of the direction of gravity exceeds the predetermined angle, when executed by the processor, further cause the apparatus to:

determine if a current direction of gravity deviates from a baseline direction of gravity by a third threshold.

14. The apparatus of claim 8, wherein the memory storing computer-executable instructions that, when executed by the processor, further cause the apparatus to:

determine, after determining that the rate of rotation of the apparatus perpendicular to the direction of gravity exceeds the first threshold and prior to the determining if the rate of rotation of the apparatus parallel to the direction of gravity exceeds the rate of rotation caused by turning of vehicle, to take additional steps to confirm that the apparatus is being handled within the vehicle.

15. A system comprising:

a mobile device comprising:
  an accelerometer configured to measure acceleration of the mobile device, and
  a gyroscope configured to measure orientation of the mobile device; and
a computing device comprising:
  a processor; and
  memory storing computer-executable instructions that, when executed by the processor, cause the computing device to:
    determine, based on a direction of gravity of the mobile device and a rotation vector of the mobile device, a rate of rotation of the mobile device perpendicular to the direction of gravity;
    based on a determination that the rate of rotation of the mobile device perpendicular to the direction of gravity exceeds a first threshold, determine if a rate of rotation of the mobile device parallel to the direction of gravity exceeds a rate of rotation caused by turning of a vehicle within which the mobile device is located; and
    based on a determination that the rate of rotation of the mobile device parallel to the direction of gravity exceeds the rate of rotation caused by turning of the vehicle, determine that the mobile device is being used within the vehicle.

16. The system of claim 15, wherein the direction of gravity of the mobile device is determined based on acceleration measurements made by the accelerometer over a period of time.

17. The system of claim 15, wherein the rate of rotation of the mobile device perpendicular to the direction of gravity is determined based on orientation measurements made by the gyroscope.

18. The system of claim 15, wherein the memory storing computer-executable instructions that cause the computing device to determine that the mobile device is being used within the vehicle, when executed by the processor, further cause the computing device to:

determine, based on determining if a change of the direction of gravity exceeds a predetermined angle, that the mobile device is being used within the vehicle.

19. The system of claim 15, wherein the memory storing computer-executable instructions that cause the computing device to determine that the mobile device is being used within the vehicle, when executed by the processor, further cause the computing device to:

determine, based on determining if an amount of lateral movement of the mobile device parallel to the direction of gravity exceeds a second threshold, that the mobile device is being used within the vehicle.

20. The system of claim 18, wherein the memory storing computer-executable instructions that cause the computing device to determine if the change of the direction of gravity exceeds the predetermined angle, when executed by the processor, further cause the computing device to:

determine if a current direction of gravity deviates from a baseline direction of gravity by a third threshold.

* * * * *